United States Patent
Durling, Jr.

(10) Patent No.: US 11,975,272 B2
(45) Date of Patent: May 7, 2024

(54) MAGNETIC THUMB-TIP COVERS INTERFACE TO MAGNETIC THUMB-STICK COVERS, MAGNETIC THUMB-STICK EXTENSIONS AND MAGNETIC DIRECTIONAL PAD THUMB-STICK APPARATUS FOR ENHANCED GAMING PERFORMANCE

(71) Applicant: Robert Gordon Durling, Jr., Ocala, FL (US)

(72) Inventor: Robert Gordon Durling, Jr., Ocala, FL (US)

( * ) Notice: Subject to any disclaimer, the term of this patent is extended or adjusted under 35 U.S.C. 154(b) by 0 days.

(21) Appl. No.: 17/394,323

(22) Filed: Aug. 4, 2021

(65) Prior Publication Data

US 2023/0037584 A1 Feb. 9, 2023

(51) Int. Cl.
*A63F 13/98* (2014.01)
*A63F 13/24* (2014.01)

(52) U.S. Cl.
CPC .............. *A63F 13/98* (2014.09); *A63F 13/24* (2014.09); *A63F 2300/1043* (2013.01)

(58) Field of Classification Search
None
See application file for complete search history.

(56) References Cited

U.S. PATENT DOCUMENTS

| | | | | |
|---|---|---|---|---|
| 6,459,420 | B1 * | 10/2002 | Harris | A63F 13/24 |
| | | | | D14/416 |
| D540,395 | S  * | 4/2007 | Bailey | D21/333 |
| D620,535 | S  * | 7/2010 | Thomas | D21/333 |
| 8,784,208 | B2 * | 7/2014 | Borrel | A63F 13/98 |
| | | | | 463/38 |
| 10,124,249 | B2 * | 11/2018 | Schmitz | A63F 13/24 |
| 10,463,977 | B1 * | 11/2019 | Houlihan | A63F 13/24 |
| 2015/0157949 | A1 * | 6/2015 | Durling, Jr. | A63F 13/24 |
| | | | | 463/47 |
| 2016/0354685 | A1 * | 12/2016 | Kujawski | A63F 13/24 |
| 2017/0172229 | A1 * | 6/2017 | DePue | A41D 13/087 |

* cited by examiner

*Primary Examiner* — Sunit Pandya (57) ABSTRACT

A magnetic thumb-tip covers interface for controller magnetic thumb-stick covers, magnetic thumb-stick extensions and magnetic directional pad thumb-slick for enhanced gaming controller performance are disclosed in the present invention. The invention is a video game magnetic connection apparatus that assists in gaming performance by allowing the gamers to connect magnetic thumb-tip covers to the magnetic thumb-sticks covers, magnetic thumb-stick extensions and magnetic directional pad thumb-stick to maneuver the controllers thumb-sticks with no or little down pressure from a center position thereby helping the gamer play a good, sustained, and comfortable game.

5 Claims, 7 Drawing Sheets

MAGNETIC THUMB-TIP COVERS INTERFACE TO MAGNETIC THUMB-STICK COVERS, MAGNETIC THUMB-STICK EXTENSIONS AND MAGNETIC DIRECTIONAL PAD THUMB-STICK APPARATUS FOR ENHANCED GAMING PERFORMANCE

BACKGROUND OF THE INVENTION

The present invention relates generally to gaming actuation devices, and more specifically to a gaming controller magnetic thumb-tip covers interface to controller gaming magnetic thumb-stick covers, magnetic thumb-stick extensions and magnetic directional pad thumb-stick for enhanced gaming performance.

Various types of handheld device controllers exist, including handheld video game controllers. Game controllers are devices used with video game and/or entertainment systems to enable users to provide input, which may include controlling a character in a game, selecting audio and/or video content, and/or controlling other aspects related to the systems. Video game controllers are designed, or technically manufactured with thumb-sticks and a directional pad or D-pad (a flat, usually thumb operated, four-way directional control with one button on each point) for game controlling and the use of these devices are not short of problems. When a gamer's thumbs interact with a game controller for prolonged periods, the gamer may suffer fatigue, discomfort, blistering and pain because of continuous pressure and motion. This may also cause a variety of painful health conditions such as gamer thumb and carpal tunnel. Also, playing certain games with the directional pad may not provide the gamer with optimal performance especially when using a controller that lacks thumb-sticks.

It is therefore desirable to have a gaming controller thumb-tip cover interface that helps to protect the gamer from suffering from the aforementioned health problems and at the same time provides optimal performance when playing games with a controller.

As can be seen, there is a need for a magnetic thumb-tip covers, magnetic thumb-stick covers, magnetic thumb-stick extensions and magnetic directional pad thumb-stick for enhanced gaming controller performance that allows for maneuvering of the controller thumb-sticks through leverage.

SUMMARY OF THE INVENTION

In one aspect the following summary discloses all the features and functions of the present invention. By considering the whole specification, claims, drawings and abstract, one can easily get a full understanding of the invention and how it functions.

In another aspect the present invention consists of magnetic silicon gaming controller thumb-tip covers which is to be worn on the thumb(s), magnetic gaming thumb-stick covers which are secured over the cap of the controller thumb-sticks, magnetic thumb-stick extensions which are fitted on top the magnetic thumb-stick covers and a magnetic directional pad thumb-stick that is placed over the controller's directional pad (D-pad) for enhanced gaming performance.

The invention relates to gaming accessories, i.e., detachable arrangements optional for use on a video game device controller, an apparatus that assists garners with issues related to game controller problems such as gamer thumb, carpal tunnel while enhancing gaming performance as well.

These and other features, aspects and merits of the present invention will become evident and will be better understood with reference to the following drawings, detailed description, and claims.

DETAILED DESCRIPTION OF THE INVENTION

The following description is of the best contemplated modes of carrying out exemplary embodiments of the present invention. It is important to take note that this description is not to be taken in a limiting sense but is made for the purpose of illustrating the general principles of the invention. Skilled artisans will appreciate that the elements in the figures are illustrated with simplicity and clarity and have not necessarily been drawn to scale. For example, the dimensions of some of the elements in the figures may be exaggerated, as in relation to other elements, to help to improve understanding of embodiments of the present invention.

Broadly the present invention provides an embodiment of a gaming accessory interface comprising a gaming controller magnetic thumb-tip covers which are to be worn on the thumbs, gaming magnetic thumb-stick covers which are secured over the caps of the controller thumb-sticks, magnetic thumb-stick extensions which are fitted on top the magnetic thumb-stick covers and a magnetic directional pad thumb-stick that is secured to the controller's directional pad (Dpad) for enhanced gaming performance.

Figure 1:
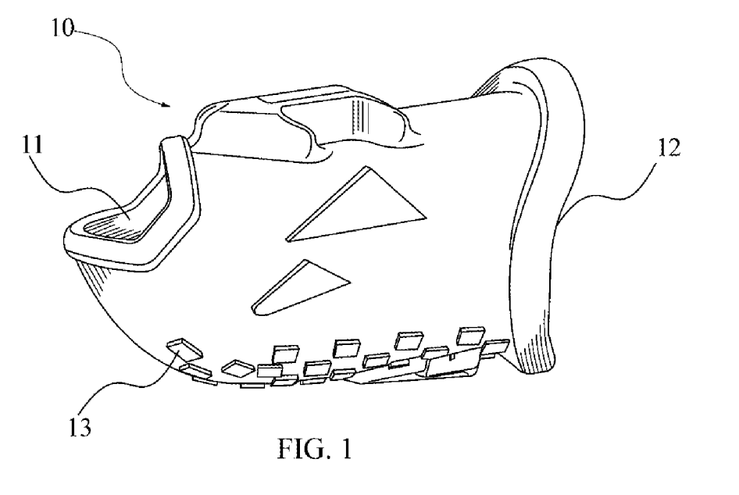
FIG. 1 is perspective view of a magnetic thumb-tip cover of the present invention.

As illustrated in FIGS. 1 to 13:

Referring to FIG. 1, the invention comprises a magnetic thumb-tip cover 10. The magnetic thumb-tip cover 10 further comprises an entrance 12.

Figure 2:
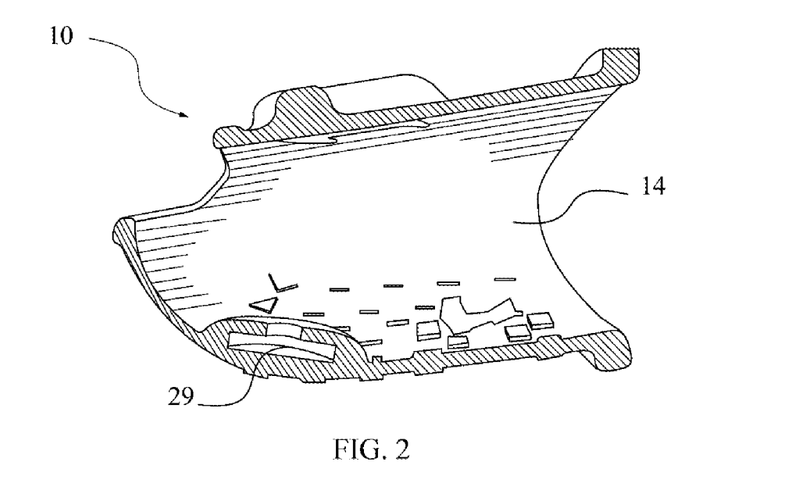
FIG. 2 is a sectional view of the magnetic thumb-tip cover of the present invention.

Referring to FIG. 2, the invention comprises a sectional view of the magnetic thumb-tip cover 10 disclosing the interior 14 of the magnetic thumb-tip cover 10 and where the magnet is embedded 29 of the magnetic thumb-tip covers 10.

Figure 3:
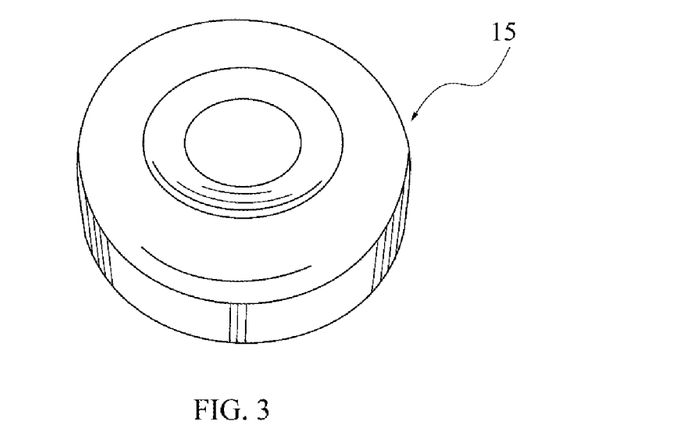
FIG. 3 is a perspective view of a magnetic thumb-stick cover of the present invention.
Figure 4:
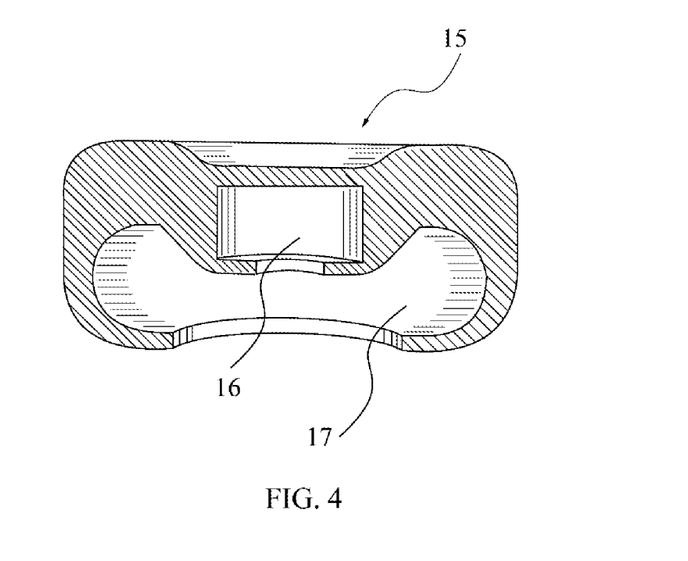
FIG. 4 is a sectional view of the magnetic thumb-stick cover of the present invention.

Referring to FIGS. 3 to 4, FIG. 3, the invention comprises a magnetic thumb-stick cover 15. FIG. 4, the invention comprises a sectional view of the magnetic thumb-stick cover 15 disclosing the interior embedded magnet position 16, and the interior of the magnetic thumb-stick covers 17 where the controller thumb-sticks 27a and 27b of a gaming controller fit into.

Figure 5:
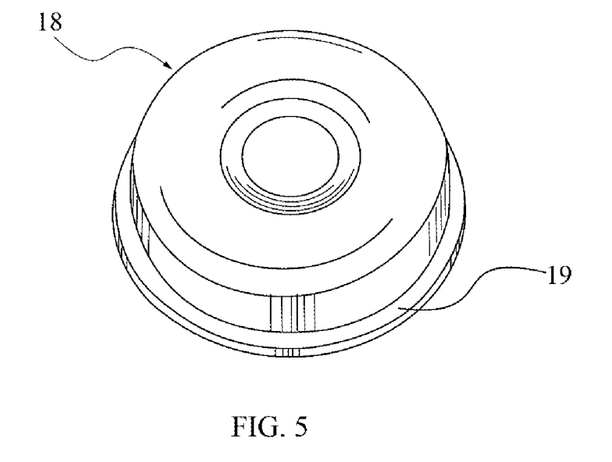
FIG. 5 is a perspective view of a magnetic thumb-stick extension of the present invention.
Figure 6:
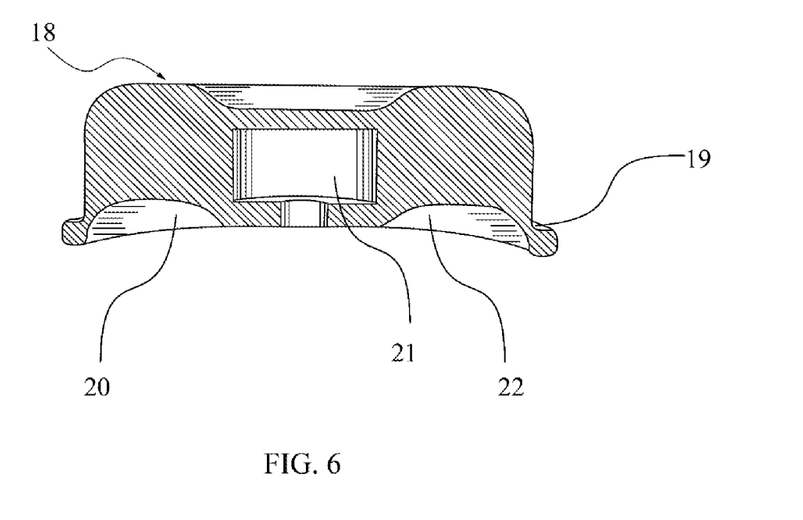
FIG. 6 is a sectional view of the magnetic thumb-stick extension of the present invention.

Referring to FIGS. 5 to 6, FIG. 5, the invention comprises a magnetic thumb-stick extension 18, and a base 19 which allows the fixture of the magnetic thumb-stick extension 18 on top the magnetic thumb-stick cover 15. FIG. 6, the invention further comprises a sectional view of the magnetic thumb-stick extension 18 disclosing the base 19, and interior 20 and 22 to secure around controller thumb-sticks 27a and 27b. The interior embedded magnet position 21 is also disclosed.

Figure 7:
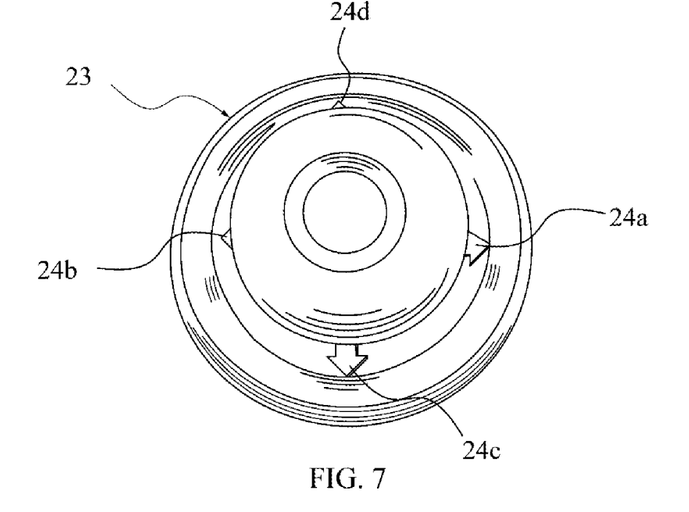
FIG. 7 is a top perspective view of a magnetic directional pad thumb-stick of the present invention.
Figure 8:
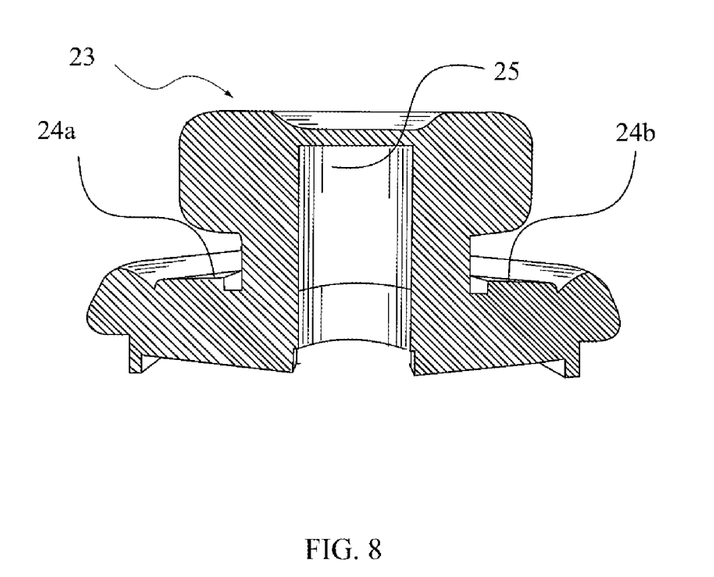
FIG. 8 is a sectional view of the magnetic directional pad thumb-stick of the present invention.
Figure 9:
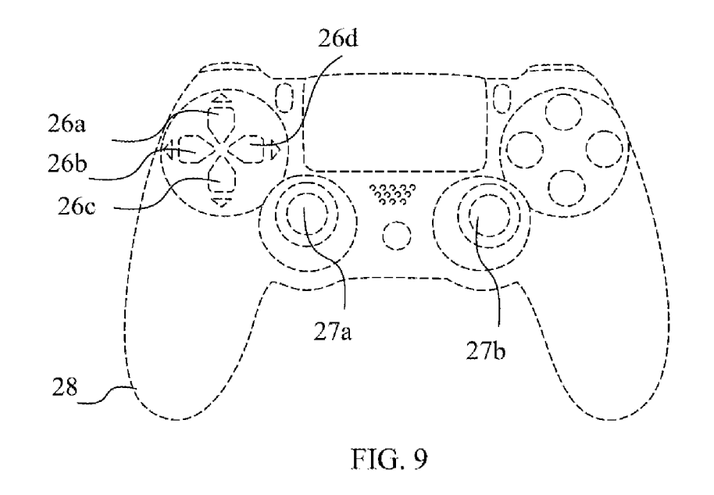
FIG. 9 is a top view of a gaming controller without the magnetic thumb-tip covers, the magnetic thumb-stick covers, the magnetic thumb-stick extensions and the magnetic directional pad thumb-stick of the present invention without the present invention.

Referring to FIGS. 7 to 8, FIG. 7, the invention comprises a magnetic directional pad thumb-stick 23 with directional arrows pointing up 24d, down 24c, left 24b and right 24a. FIG. 8, the invention further comprises a sectional view of the magnetic directional pad thumb-stick 23, disclosing the interior embedded magnet position 25 and two of the directional arrows 24b and 24a.

Figure 10:
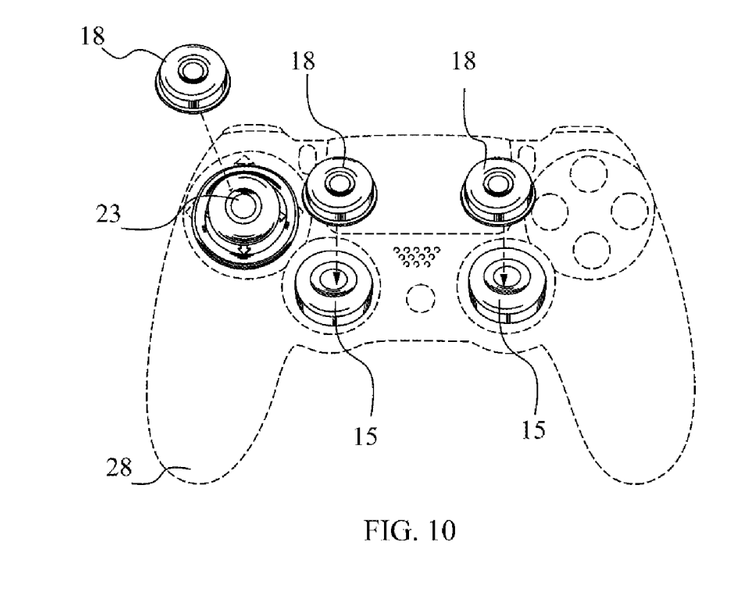
FIG. 10 is a top view of a gaming controller with the magnetic thumb-stick covers, the magnetic thumb-stick extensions and the magnetic directional pad thumb-stick of the present invention with the present invention.
Figure 11:
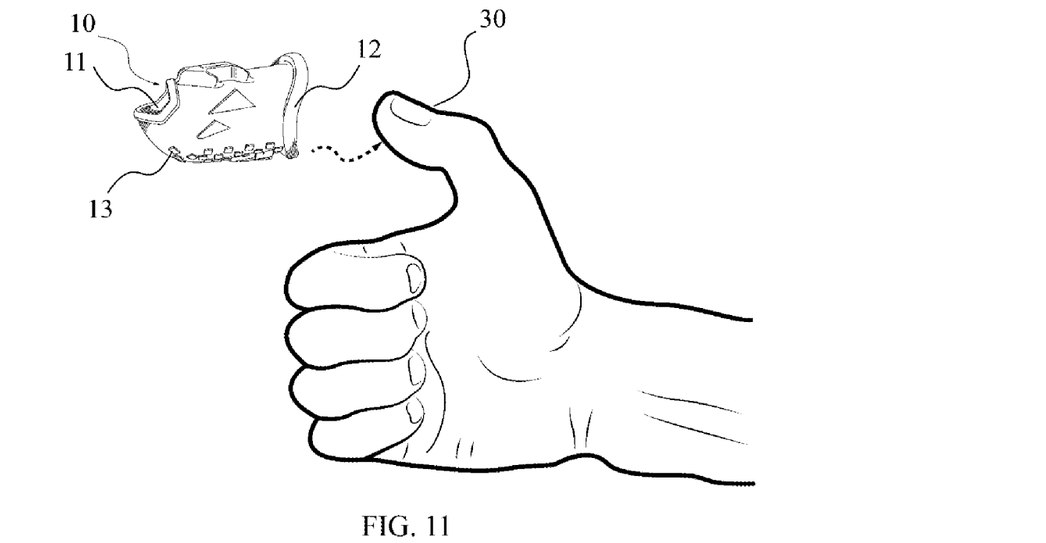
FIG. 11 is a exploded view of a magnetic thumb-tip cover of the present invention being placed for use.
Figure 12:
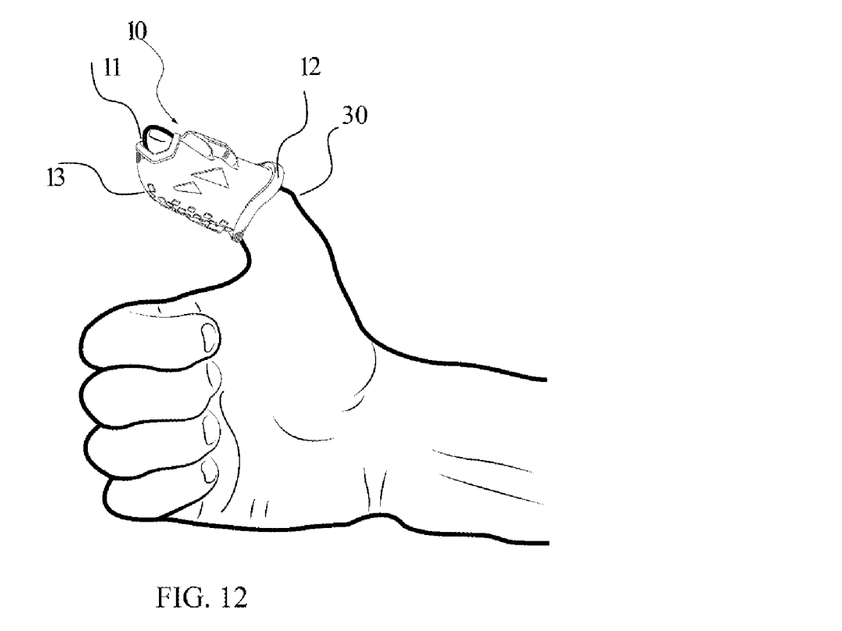
FIG. 12 is a exploded view of a magnetic thumb-tip cover of the present invention securing a magnetic thumb-tip cover.
Figure 13:
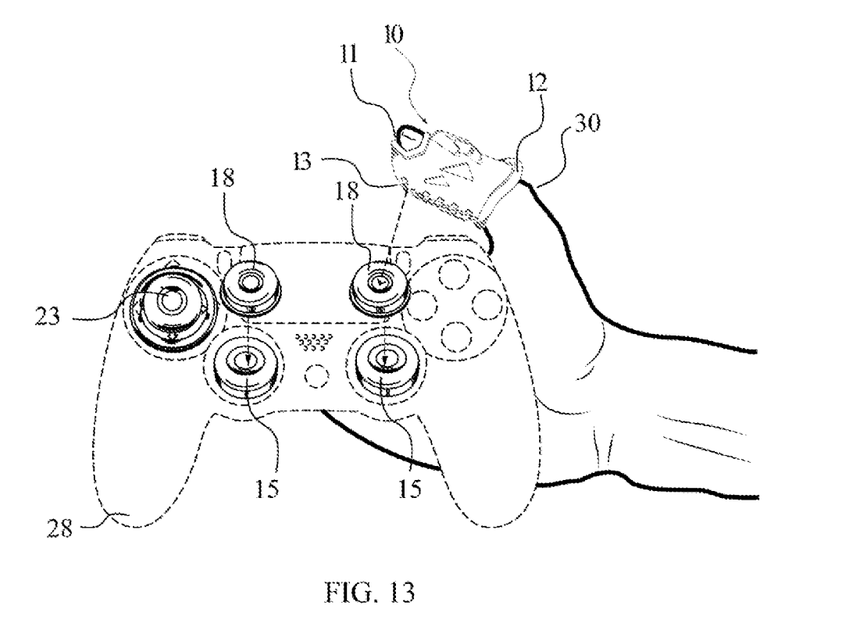
FIG. 13 illustrates a top view of a gaming controller with the magnetic thumb-tip covers, magnetic thumb-stick covers, magnetic thumb-stick extensions and the magnetic directional pad thumb-stick of the present invention with the present invention.

Referring to FIGS. 9 to 13, FIG. 9 is an illustration of a typical gaming controller consisting of the thumb-sticks 27a and 27b and the directional pad (D-pad) 26a, 26b, 26c, and 26d without the present invention. FIG. 10, discloses the magnetic thumb-stick cover 15, and 15, the magnetic thumb-stick extensions 18 and 18, the magnetic directional pad thumb-stick 23 with its corresponding magnetic thumb-stick extension 18 and the game controller 28 in broken lines. FIG. 11, the invention comprises a magnetic thumb-tip cover 10. The magnetic thumb-tip cover 10 further comprises an entrance 12 through which the thumb 30 slides into an entrance in the front 11. FIG. 12, to maneuver the magnet to a preferred position on the thumb 30 and raised platform 13 to aid the grip for the magnetic thumb-stick cover 10 during game play. FIG. 13, Discloses the full invention comprising the magnetic thumb stick covers for thumb 10, the magnetic thumb-stick covers 15 and 15, the magnetic thumb-stick extensions 18 and 18, the magnetic directional pad thumb-stick 23 with its corresponding magnetic thumb-stick extension 18 and the game controller 28 in broken lines. It is important to note that the illustrations made in broken lines are not part of the claimed invention.

The present invention solves two main problems that plague the video gaming industry, gamer thumb and performance. This apparatus allows the garners to connect their magnetic thumb-tip covers 10 to the magnetic thumb-stick covers 15 and maneuver the controller thumb-sticks 27a and 27b with no or little down pressure. This apparatus connects the gamer to the center of the controller thumb-sticks 27a and 27b. That allows the gamer to be in a one muscle memory connect while playing video games and increases the garners performance. This apparatus also allows the gamer to play from the center of the controller thumb-sticks 27a and 27b where all games are designed to be played and will increase gamer performance.

A game controller 28 may include one or more controller thumb-sticks 27a and 27b, which are stick-shaped user input interface features that are positioned and shaped to be manipulated by a thumb 30 of a user (although a thumb-stick can be manipulated by other fingers). A controller thumb-sticks 27a and 27b is actuatable by the user to provide input for a variety of game functions.

The controller thumb-sticks 27a and 27b operator typically uses the controller thumb-sticks 27a and 27b to control movement during the game for positioning to accomplish a goal or to avoid a dangerous threat. Therefore, good, sustained, comfortable contact with the controller thumb-sticks 27a and 27b is essential to the success of the operator during the game.

In its current state, this invention has proven to surpass any previous inventions and previous common practices. However, to the best of the inventor's knowledge, the invention formed by previous methods are unsatisfactory. Hence, the inventor of the present invention proposes to resolve and surmount existent difficulties to eliminate the shortcomings of prior art.

Other devices or systems do not allow the gamer to connect and maneuver the controller thumb-sticks 27a and 27b by leveraging them rather than applying the pressure necessary without the present apparatus. The other devices or systems do not to keep the gamer in the center of the controller thumb-sticks 27a and 27b while playing to assist in game performance.

The invention consists of magnetic thumb-tip covers 10, magnetic thumb-stick covers 15, magnetic thumb-stick extensions 18 and the magnetic directional pad thumb-sticks 23. The magnetic thumb-tip covers 10 goes over the gamer's thumb-tips and connect to the magnetic thumb-stick covers 15 that goes over the video game controller thumb-sticks 27a and 27b. Magnetic thumb-stick extensions 18 goes over the magnetic thumb-stick covers 15 and the magnetic thumb-tip covers 10 connect to them to elevate the controller thumb-sticks 27a and 27b while playing. The magnetic thumb-stick extensions 18 is a break away design to aid in performance and encourage less thumb pressure The magnetic directional pad thumb-stick 23 and magnetic thumb-stick extension 18 is a magnetic elevation that goes over the traditional directional pad 26a, 26b, 26c and 26d on the video game controllers. This can be played individually or together with the apparatus as well. The main function of the invention is to allow the gamer to maneuver the directional pad from one center position rather than its traditional four positions 26a, 26b, 26c and 26d currently available without the directional pad thumb-stick 23. This will dramatically increase the gamer's maneuverability and increase their performance.

It is important to note that all the components in this apparatus can work individually and or together, depending on the gamer's preference. It also works individually and together to assist with issues relating to gamer thumb, repetitive stress injury (RSI) or carpal tunnel by adding extra support to areas that are getting excessive pressure from playing on the gaming controller. The magnetic thumb-tip covers 10 and magnetic thumb-sticks covers 15 are magnetic to connect the gamer to the game controller. This allows the gamer to maneuver the controller thumb-sticks 27a and 27b with little or no down pressure. This will help eliminate all or most pressure that is causing the gamer thumb issues. This connection will also help the gamer to hold and use the controller in a more ergonomic position. The magnetic center connection is also considered a training device to teach the gamer to not aggressively manipulate the controller thumb-sticks 27a and 27b.

The second problem this apparatus will assist with is increasing the garners performance. This seems to be the most important and the main reason most garners play. The magnetic thumb-tip covers 10 are connected to the magnetic thumb-stick covers 15 or the magnetic thumb-stick extensions 18 (when attached). Having one magnetic connection in the middle of the controller thumb-sticks helps the garners in several ways to increase performance. Firstly, when connected, the thumb 30 does not slip from the controller thumb-stick 27a and 27b due to the connection between the magnetic thumb-tip cover 10 on the gamer's thumb 30 and the magnetic thumb-stick covers 15 on the controller thumb-sticks 27a and 27b.

Secondly, when playing from one position on the controller thumb-sticks 27a and 27b rather than several positions around the controller thumb-sticks 27a and 27b it puts the gamer in one muscle memory position. This allows the gamer to maneuver the controller thumb-sticks 27a and 27b faster and more efficiently. The magnetic connection and position allow the gamer to increase their controller sensitivity thereby, increasing their performance.

The magnetic thumb-stick extensions 18 are designed to be applied to or taken off during game play. These also assist people with larger hands in maneuvering the controller thumb-sticks 27a and 27b better because currently, most controllers are one sized. This will also allow garners to have an elevated position to leverage the controller thumb-sticks 27a and 27b easier with less twerking. This will also assist in greater performance.

All the components in this apparatus are manufactured with different molds. The magnetic thumb-tip covers 10 are either thin silicone or rubber, designed to fit the garners thumbs to size. This gives the most possible sensitivity to the gamers thumb 30. A magnet is embedded in the magnetic thumb-tip covers center 29.

The magnetic thumb-stick covers 15 are either silicone or rubber and designed to fit any video game controller. A magnet is embedded in the magnetic thumb-stick covers center 16. The components could be shuffled, interchanged, and or reconfigured to help with military or civilian drone controllers or radio-controlled devices. Any controller or device that requires thumb interface can work with this invention.

A person can make use of this invention by purchasing the product. Then assembling the apparatus to their video game controller 28. Put on the magnetic thumb-tip covers 10. Then connect to the magnetic thumb-sticks 15 and start playing their game by leveraging the controller thumb-sticks 27a and 27b. The gamer can access the magnetic thumb-stick extensions 18 with ease from the magnetic thumb-stick cover 15 while playing.

Having described the invention in detail, it should be understood that the stated description relates to exemplary embodiments of the present invention and those skilled in the art will appreciate that modifications may be made to the invention without departing from its spirit and scope as provided in the following claims.

What is claimed is:

1. A gaming controller magnetic interface apparatus comprising:
    a magnetic thumb-tip cover wearable on the thumb;
    a magnetic thumb-stick cover removably attaches to the gaming controller thumb-stick;
    a magnetic thumb-stick extension removably attaches to the gaming controller thumb-stick cover;
    a magnetic thumb-tip cover wearable on the thumb and removably attachable to a magnetic directional pad thumb-stick whereby the said magnetic directional pad thumb-stick has a magnet embedded in the center position removably attaches to the traditional directional pad of the gaming controller.

2. The gaming controller magnetic interface apparatus of claim 1 whereby the said magnetic thumb-tip cover comprises of a magnet embedded in the center of the thumb-tip cover removably attaches to the thumb-stick cover.

3. The gaming controller magnetic interface apparatus of claim 1 whereby the said magnetic thumb-stick cover comprises of a magnet embedded in the center of the thumb-stick cover removably attaches to the controller thumb-stick.

4. The gaming controller magnetic interface apparatus of claim 1 whereby the said magnetic thumb-stick extension comprises of a magnet embedded in the center of the thumb-stick extension removably attaches to the thumb-stick cover.

5. The gaming controller magnetic interface apparatus of claim 1 whereby the said magnetic directional pad thumb-stick has a magnet embedded in the center position removably attaches to the traditional directional pad four positions by double sided adhesives and has a magnetic thumb-stick extension that removably attaches to the said magnetic directional pad thumb-stick.

* * * * *